United States Patent [19]

Inoue

[11] Patent Number: 4,967,556
[45] Date of Patent: Nov. 6, 1990

[54] HYDROSTATICALLY OPERATED CONTINUOUSLY VARIABLE TRANSMISSION

[75] Inventor: Kazuo Inoue, Tokyo, Japan

[73] Assignee: Honda Giken Kogyo Kabushiki Kaisha, Tokyo, Japan

[21] Appl. No.: 349,567

[22] Filed: May 9, 1989

Related U.S. Application Data

[62] Division of Ser. No. 156,727, Feb. 17, 1988, Pat. No. 4,854,125.

[30] Foreign Application Priority Data

Feb. 20, 1987 [JP] Japan ................................. 62-37547
Feb. 20, 1987 [JP] Japan ................................. 62-37548

[51] Int. Cl.⁵ .......................................... F16D 39/00
[52] U.S. Cl. ......................................... 60/489; 60/487
[58] Field of Search ................. 60/487, 488, 489, 325; 91/499, 504, 505, 506

[56] References Cited

U.S. PATENT DOCUMENTS

| | | |
|---|---|---|
| Re. 24,317 | 5/1957 | Schott . |
| 1,274,391 | 8/1918 | Davis .................................. 60/489 |
| 2,706,384 | 4/1955 | Schott . |
| 2,984,070 | 5/1961 | Bauer . |
| 3,161,023 | 12/1964 | Margolin et al. . |
| 3,165,892 | 1/1965 | Roberts . |
| 4,444,093 | 4/1984 | Koga et al. ...................... 91/507 X |
| 4,478,134 | 10/1984 | Kawahara et al. ............... 91/499 X |
| 4,741,251 | 5/1988 | Hayashi et al. .................. 91/506 X |
| 4,745,748 | 5/1988 | Hayashi et al. . |
| 4,827,721 | 5/1989 | Hayashi et al. . |

FOREIGN PATENT DOCUMENTS

| | | |
|---|---|---|
| 0186500 | 7/1986 | European Pat. Off. . |
| 0209286 | 1/1987 | European Pat. Off. . |
| 55-152622 | 11/1980 | Japan . |
| 57-76357 | 5/1982 | Japan . |
| 61-153057 | 7/1986 | Japan . |

Primary Examiner—Edward K. Look
Attorney, Agent, or Firm—Lyon & Lyon

[57] ABSTRACT

A hydrostatically operated continuously variable transmission includes a cylinder block centrally coupled to a transmission shaft coupled to an engine, a swash-plate-type axial-piston hydraulic pump having a group of pump plungers, a hydraulic motor having a group of motor plungers, and a closed hydraulic circuit by which the hydraulic pump and the hydraulic motor are interconnected. The groups of pump and motor plungers are disposed in annular patterns in the cylinder block, and disposed concentrically such that one of the groups surrounds the other group. The plunger groups are positionally displaced in the circumferential direction of the cylinder block such that a circle inscribed in said one group passes through the other group.

12 Claims, 9 Drawing Sheets

HYDROSTATICALLY OPERATED CONTINUOUSLY VARIABLE TRANSMISSION

This is a division of application Ser. No. 156,727, filed Feb. 17, 1988 now U.S. Pat. No. 4,854,125.

BACKGROUND OF THE INVENTION

The present invention relates to a hydro-statically operated continuously variable transmission including a swash-plate-type axial-piston hydraulic pump and a hydraulic motor which are coupled in a closed hydraulic circuit, the hydraulic pump and motor having respective groups of pump and motor plungers which are disposed in annular patterns in a common cylinder block that is centrally coupled to a transmission shaft.

Hydrostatically operated continuously variable transmissions are known in the art as disclosed in Japanese Laid-Open Patent Publication No. 61-153057, for example.

In the conventional hydrostatically operated continuously variable transmission, groups of pump and motor plungers are disposed perpendicularly to the axis of a cylinder block, and hence the cylinder block which accommodates these pump and motor plungers must be axially elongate. Therefore, it has been difficult to make the hydrostatically operated continuously variable transmission more compact.

A swash-plate-type hydraulic device, which may serve as the swash-plate-type axial-piston hydraulic pump or the hydraulic motor, has a working oil distributor having mutually concentric high- and low-pressure hydraulic chamber defined in the cylinder block around the axis thereof. The working oil distributor includes a number of radial distribution valves that are reciprocally movable between radially outer and inner positions in the cylinder block for bringing cylinder holes defined in the cylinder block into alternate communication with the high- and low-pressure hydraulic chambers. An eccentric ring is disposed eccentrically with respect to the center of rotation of the cylinder block in contact with the radially outward portions of the distribution rings for imparting reciprocating movement to the distribution rings in response to relative rotation of the cylinder block and the plunger swash plate. Such a working oil distributor is known from Japanese Laid-Open Patent Publication No. 61-153057.

The swash-plate-type hydraulic device tends to have an axial dimension greater than the outside diameter of the cylinder block since annular groups of plungers disposed in the cylinder holes are disposed parallel to the axis of the cylinder blocks. With the conventional working oil distributor incorporated in the swash-plate-type hydraulic device, the group of distribution valves must be located at one end of the group of plungers, resulting in an increase in the axial dimension of the cylinder block, and it is difficult to render the swash-plate-type hydraulic device more compact.

SUMMARY OF THE INVENTION

In view of the aforesaid problems of the conventional hydrostatically operated continuously variable transmission, it is an object of the present invention to provide a hydrostatically operated continuously variable transmission of a compact configuration with groups of pump and motor plungers being housed in a cylinder having a reduced axial dimension.

Another object of the present invention is to provide a hydrostatically operated continuously variable transmission having a swash-plate-type hydraulic device of a compact size including a working oil distributor which comprises distribution valves arranged without involving an increase in the axial dimension of a cylinder block.

According to the present invention, there is provided a hydrostatically operated continuously variable transmission for use with an engine, comprising a transmission shaft adapted to be coupled to the engine, a cylinder block centrally coupled to the transmission shaft, a swash-plate-type axial-piston hydraulic pump having a group of pump plungers, a hydraulic motor having a group of motor plungers, and a closed hydraulic circuit by which the hydraulic pump and the hydraulic motor are interconnected, the groups of pump and motor plungers being disposed in annular patterns in the cylinder block, the groups of pump and motor plungers being disposed concentrically such that one of the groups surrounds the other group, and being positionally displaced in the circumferential direction of the cylinder block such that a circle inscribed in said one group passes through the other group.

The pump plungers may be disposed inwardly of the motor plungers or the vice versa.

Since the pump plungers and the motor plungers are disposed concentrically, the axial dimension of the cylinder block which accommodates the pump and motor plungers is greatly reduced.

Inasmuch as the inner and outer plunger group are positionally displaced with respect to each other in the circumferential direction of the cylinder block such that the circle inscribed in the outer plunger group passes through the inner plunger group, the portion of the cylinder which which lies between the inner and outer plungers has a sufficient wall thickness but the inner and outer plunger groups are disposed closely to each other. Therefore, any increase in the diameter of the cylinder block arising from the concentric arrangement of the plunger groups is minimized.

According to the present invention, there is also provided a working oil distributor in a swash-plate type hydraulic device, comprising a cylinder block having an annular array of cylinder holes and a plurality of plungers slidably disposed respectively in the cylinder holes, a plunger swash plate engaging projecting ends of the plungers, high- and low-pressure oil chambers defined in the cylinder block for supplying working oil to and receiving working oil from the cylinder holes in response to relative rotation of the cylinder block and the plunger swash plate, the high- and low-pressure oil chambers being disposed annularly around the axis of the cylinder block and arranged axially of the cylinder block, a plurality of distribution valves disposed annularly in the cylinder block concentrically with the plungers and reciprocally movable between positions spaced axially of the cylinder block for alternately communicating the cylinder holes with the high- and low-pressure oil chambers, a holder by which the plunger swash plate is supported, and a valve swash plate contacting ends of the distribution valves for imparting reciprocating motion to the distribution valves in response to relative rotation of the cylinder block and the plunger swash plate, the valve swash plate being supported on the holder obliquely to the axis of the cylinder block.

The working oil distributor may be incorporated in a hydraulic pump or a hydraulic motor.

When the cylinder block and the plunger swash plate are relatively rotated, the distribution valves are caused by the valve swash plate to move reciprocally in the axial direction of the cylinder block to alternately communicate the corresponding cylinder holes with the high- and low-pressure oil chambers for supplying and receiving working oil.

Since the distribution valves are disposed in an annular pattern concentric with the plungers, the cylinder block with the distribution valves is not increased in axial dimension.

The valve swash plate may be positioned in a space around the plunger swash plate. Therefore, the valve swash plate does not result in an increase in the axial dimension of the hydraulic device.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
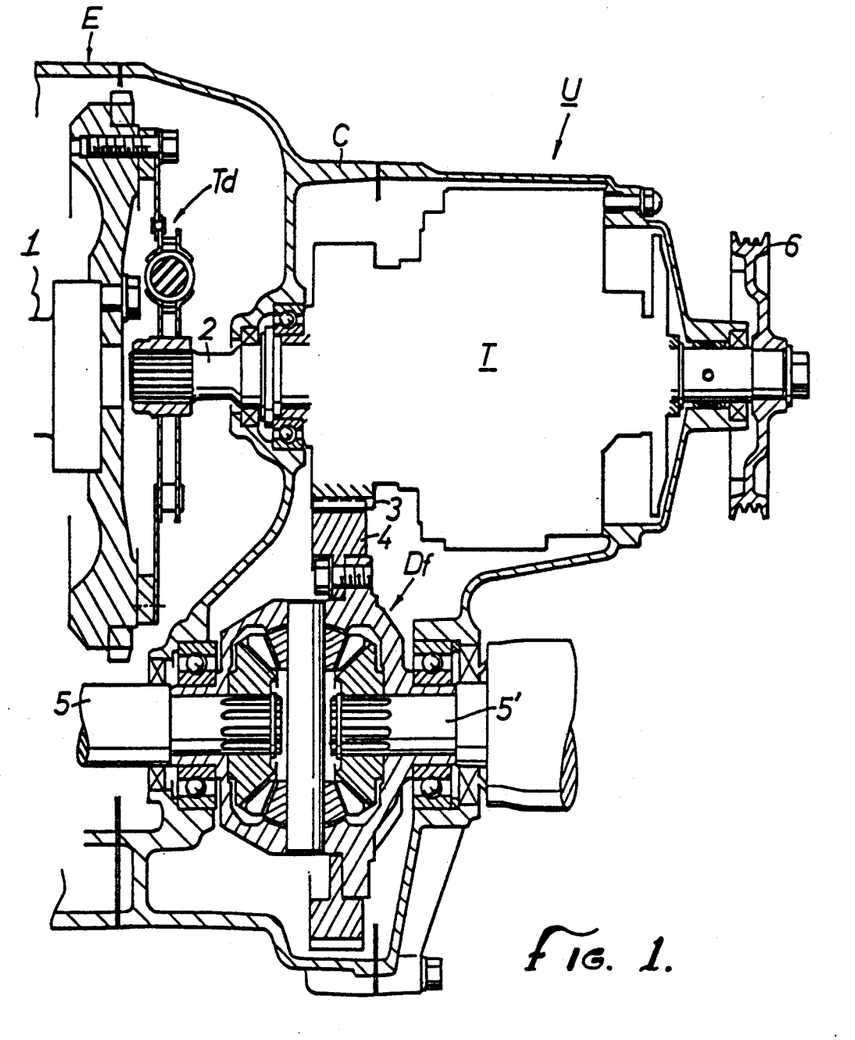
FIG. 1 is a cross-sectional view of an automotive power unit incorporating a hydrostatically operated continuously variable transmission according to the present invention.

As shown in FIG. 1, an automotive power unit U generally comprises an engine E, a hydrostatically operated continuously variable transmission T according to the present invention, and a differential Df which are all housed and supported in a casing C serving as a stationary machine frame.

The engine E has a crankshaft 1, and the continuously variable transmission T positioned at the righthand (FIG. 1) end of the engine E has an input shaft 2 disposed as a transmission shaft coaxially with the crankshaft 1 and coupled thereto through a torque damper Td. The continuously variable transmission T has an output gear 3 located closely to the engine E and meshing with a ring gear 4 of the differential Df. The differential Df has axially opposite output shafts 5, 5' parallel to the crankshaft 1 and the input shaft 2 for driving respective road wheel axles (not shown).

The input shaft 2 has a righthand end projecting out of the casing C and supporting a pulley 6 thereon for driving various accessories such as a power steering hydraulic pump, an air conditioning compressor, and the like.

Figure 2:
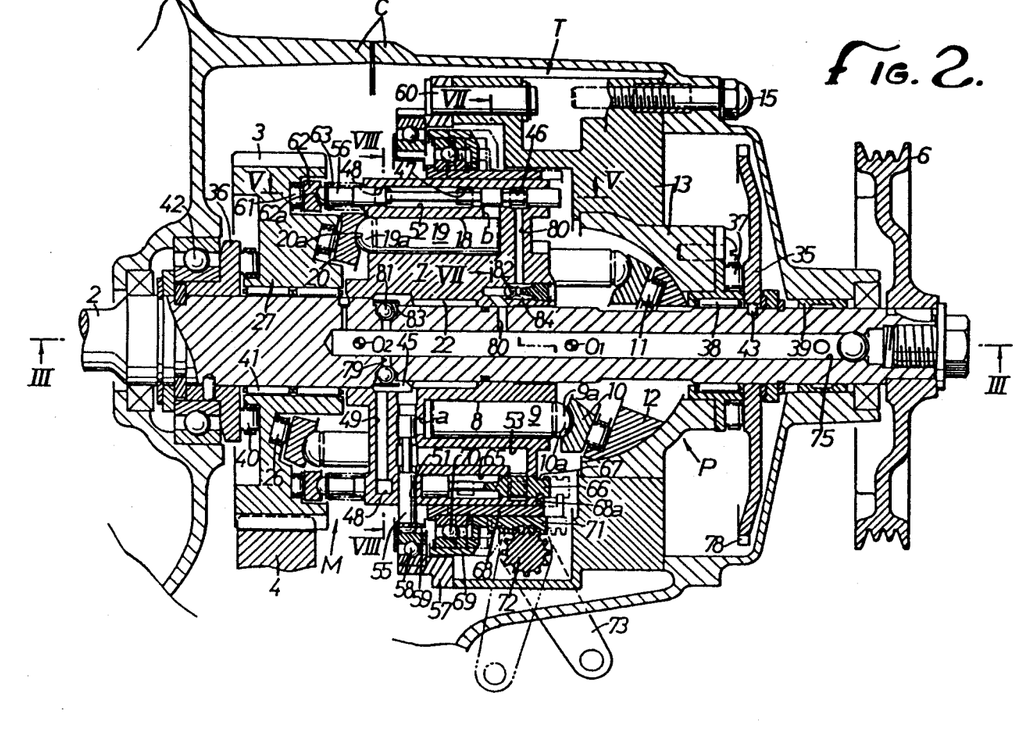
FIG. 2 is a longitudinal cross-sectional view of the hydrostatically operated continuously variable transmission shown in FIG. 1.
Figure 3:
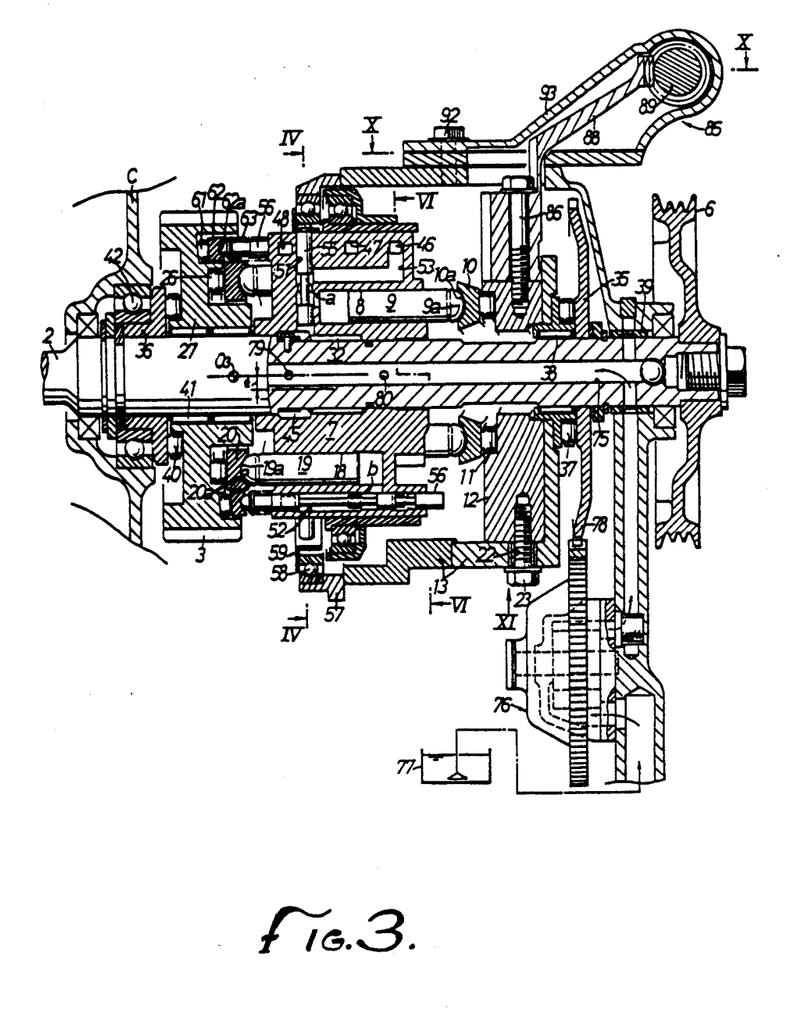
FIG. 3 is a cross-sectional view taken along line III—III of FIG. 2.

As shown in FIGS. 2 and 3, the continuously variable transmission T generally comprises a swash-plate-type axial-piston hydraulic pump P of the variable displacement type and a swash-plate-type axial-piston hydraulic motor M of the fixed displacement type. The principles of the present invention are applied particularly to a working oil distributor in the hydraulic motor M.

The hydraulic pump P has a cylindrical cylinder block 7 having an odd number of cylinder bores or holes 8 defined therein in an annular pattern around the center of rotation of the cylinder block 7 the cylinder holes 8 having open righthand ends, a number of pump plungers 9 slidably disposed in the cylinder holes 8, respectively, a pump swash plate 10 held against the outer or righthand ends of the pump plungers 9, a trunnion shaft 12 of a segmental cross section having a flat surface supporting the back of the pump swash plate 10 through a thrust roller bearing 11, and a swash plate anchor 13 in which the partly cylindrical surface of the trunnion shaft 12 is rotatably supported.

The swash plate anchor 13 is fastened to the casing C by means of a bolt 15.

Figure 11:
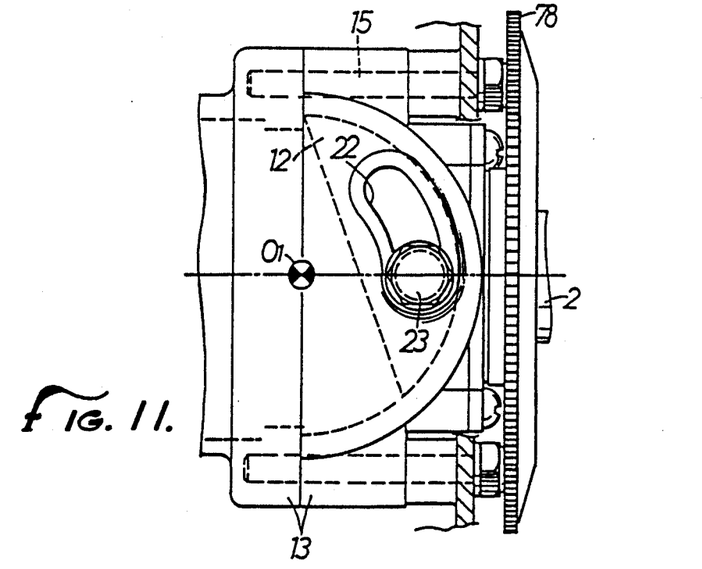
FIG. 11 is a view as viewed in the direction of the arrow XI in FIG. 3.

In order to allow the trunnion shaft 12 to rotate through a prescribed angle and also to prevent axial movement of the trunnion shaft 12, a bolt 23 (FIGS. 3 and 11) is fixed to one end surface of the trunnion shaft 12 through an arcuate slot 22 defined in the swash plate anchor 13 about the axis 01 of the trunnion shaft 12.

The pump swash plate 10 is tiltable between an upright position in which it is normal to the axis of the cylinder block 7 and two maximum tilted positions on both sides of the upright position, in which it is inclined at a certain angle, in response to rotation of the trunnion shaft 12. When the pump swash plate 10 is tilted, the pump plungers 9 can be reciprocally moved in repeated suction and discharge strokes in response to rotation of the cylinder block 7.

The hydraulic motor M has as many cylinder bores or holes 18 defined in the cylinder block 7 as the number of the cylinder holes 8 in an annular pattern concentric with and on a pitch circle slightly larger in diameter than the pitch circle of the cylinder holes 8, the cylinder holes 18 having open lefthand ends, a plurality of motor plungers 19 slidably disposed in the cylinder holes 18, respectively, a motor swash plate 20 held against the outer or lefthand ends of the motor plungers 19, and a motor swash plate holder 27 supporting the back of the motor swash plate 20 through a thrust roller bearing 26. The output gear 3 is formed on the outer periphery of the motor swash plate holder 27.

The inner cylinder holes 8 and the outer cylinder holes 18 are positionally displaced relatively by half of the pitch of these cylinder holes in the circumferential direction of the cylinder block 7. A circle inscribed in the outer annular group of cylinder holes 18 passes through the inner annular group of cylinder holes 8.

The motor swash plate 20 is kept by the motor swash plate holder 27 so as to be tilted at an angle with respect to the axis of the cylinder block 7 about an imaginary trunnion axis 02 normal to the axis of the cylinder block 7. When the cylinder block 7 and the motor swash plate holder 27 rotate relatively to each other, the motor swash plate 20 reciprocally moves the motor plungers 19 in repeated expansion and contraction strokes.

The input shaft 2 extending centrally through the cylinder block 7 is coupled thereto by means of splines 32. The righthand end portion of the input shaft 2 extends through the pump swash plate 10, the trunnion shaft 12, and the swash plate anchor 13. A thrust roller bearing 37 is interposed between a first thrust support plate 35 mounted on the righthand end portion of the input shaft 2 and the swash plate anchor 13. The righthand end portion of the input shaft 2 is rotatably supported in the swash plate anchor 13 by a needle bearing 38 and in the casing C by a bushing 39.

The first thrust support plate 35 is coupled to the input shaft 2 by means of a key 43.

The input shaft 2 has a lefthand end portion extending through the motor swash plate 20 and the motor swash plate holder 27. A thrust roller bearing 40 is interposed between a second thrust support plate 36 mounted on the lefthand end portion of the input shaft 2 and the motor swash plate holder 27, with a needle bearing 41 disposed between the motor swash plate holder 27 and the input shaft 2. The lefthand end portion of the input shaft 2 and the second thrust support plate 36 are rotatably supported in the casing C by a roller bearing 42.

The swash plates 10, 20 have respective partly spherical recesses 10a, 20a in which partly spherical ends 9a, 19a of the plungers 9, 19 engage, respectively, so as to allow the swash plates 10, 20 to rotate in synchronism with the cylinder block 7.

Figure 8:
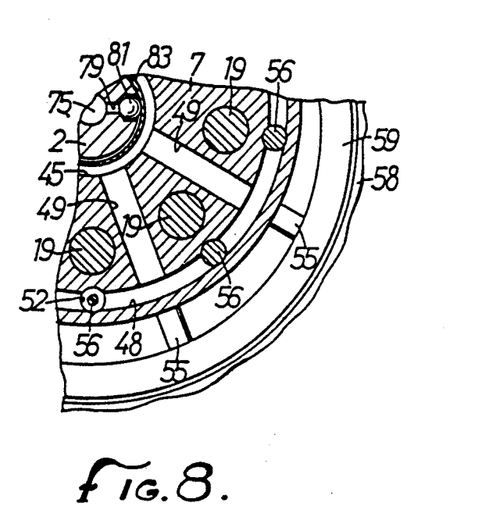
FIG. 8 is a cross-sectional view taken along line VIII—VIII of FIG. 2.

The hydraulic pump P and the hydraulic motor M are interconnected by a closed hydraulic circuit as follows:

The cylinder block 7 has an annular inner oil chamber 45 defined in its inner peripheral portion and first, second, and third annular outer oil chambers 46, 47, 48 defined in its outer peripheral portion and arranged successively axially from right to left as shown in FIGS. 2 and 3. The inner oil chamber 45 and the third outer oil chamber 48 are held in communication with each other through a plurality of radial oil passages 49 (see FIG. 8).

The cylinder block 7 also has as many first valve holes 51 (see FIG. 4) as the number of the cylinder holes 8, the first valve holes 51 extending radially adjacent to the closed ends of the cylinder holes 8, and as many second valve holes 52 as the number of the cylinder holes 18, the second valve holes 52 extending axially adjacent to the cylinder holes 18 and being disposed radially outwardly thereof.

The first valve holes 51 extend from the outer peripheral surface of the cylinder block 7 to the inner oil chamber 45. Pump ports a (see FIG. 3) are defined in the cylinder block 7 respectively through the closed ends of the cylinder holes 8 and open into the respective valve holes 51 at their intermediate portions. Oil passages 53 are defined in the cylinder block 7 radially outwardly of the pump ports a, respectively, in communication with the first outer oil chamber 46 (see FIGS. 3 and 6).

Figure 4:
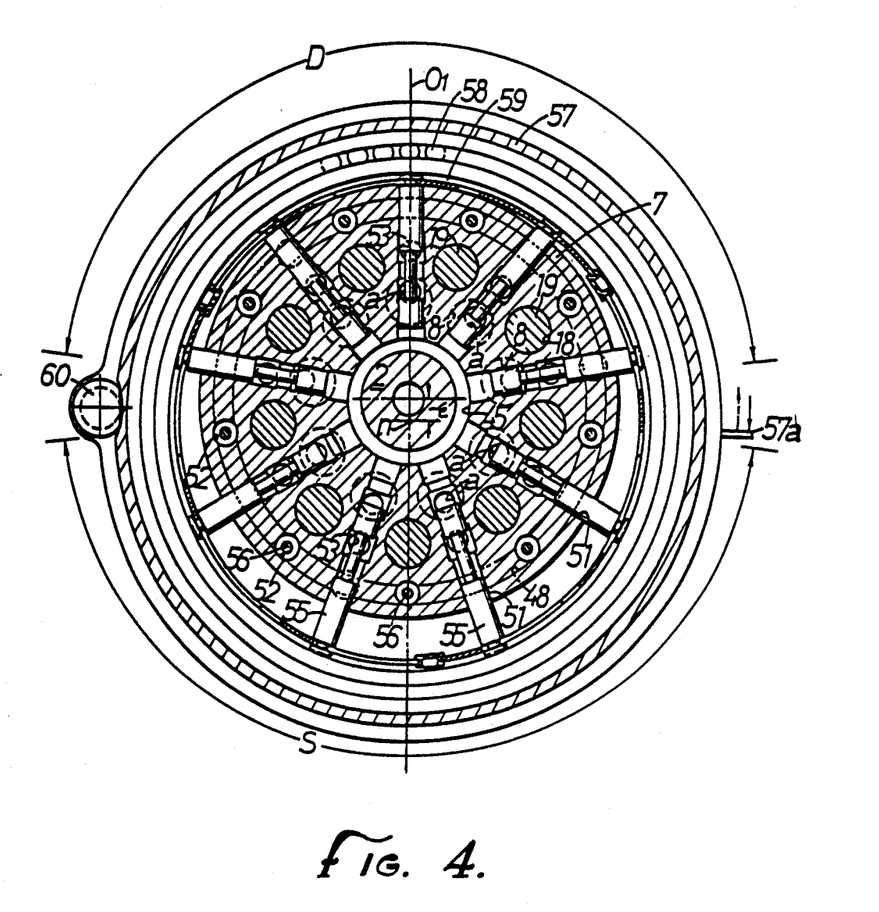
FIG. 4 is a cross-sectional view taken along line IV—IV of FIG. 3.

First spool-shaped distribution valves 55 are slidably disposed respectively in the first valve holes 51. The radially outer ends of the first distribution valves 55 are engaged by a surrounding eccentric ring 57 through a ball bearing 58. To keep the outer ends of the first distribution valves 55 in forced engagement with the eccentric ring 57, the outer ends of the first distribution valves 55 are interconnected by a forcing ring 59 concentric with the eccentric ring 57.

Figure 4A:
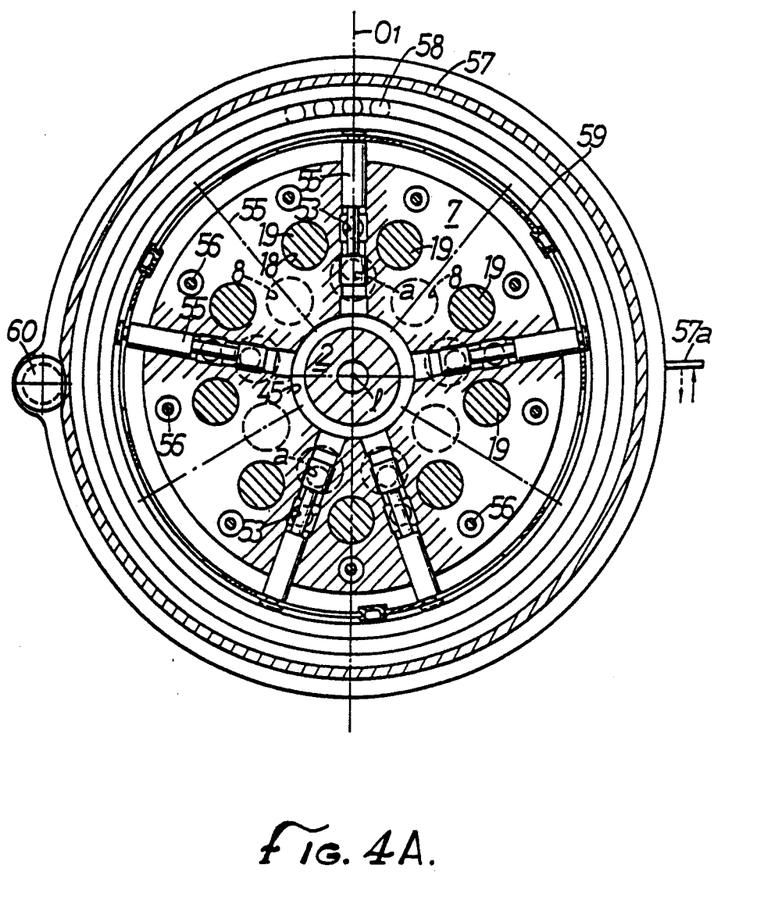
FIG. 4A is a view similar to FIG. 4, showing operation of the transmission.

As shown in FIGS. 2, 4, and 4A, the eccentric ring 57 is coupled to the swash plate anchor 13 by a pivot shaft 60 parallel to the input shaft 2 so as to be swingable between two postions, i.e., a hydraulically operating position n as shown in FIG. 4 and a lock-up position 1 as shown in FIG. 4A. The eccentric ring 57 is controlled in its eccentricity substantially along the trunnion axis 01 with the center of the input shaft 2 being used as a reference, by a control device (not shown) engaging a lever 57a projecting radially outwardly from the outer surface of the eccentric ring 57 remotely from the pivot shaft 60. The amount of eccentricity of the eccentric ring 57 is $\epsilon$ when it is in the hydraulically operating position n and is zero (i.e., it is concentric with the input shaft 2) when it is in the lock-up position 1.

When the eccentric ring 57 takes the hydraulically operating position n (see FIG. 4), and when the cylinder block 7 is rotated, the first distribution valves 55 are caused by the eccentric ring 57 to reciprocally move in the respective first valve holes 51 between radially inner and outer positions in the cylinder block 7 over a stroke which is twice the amount of eccentricity $\epsilon$. The hydraulic pump P is now given a discharge region D and a suction region S.

In the discharge region D, as the cylinder block 7 rotates, the first distribution valves 55 move near the radially inner position to provide communication between the corresponding pump ports and the outer oil passages 53 communicating with the first outer oil chamber 46 and to keep those pump ports a out of communication with the inner oil chamber 45, so that the pump plungers 9 in the discharge stroke discharge working oil from the cylinder holes 8 via the oil passages 53 into the first outer oil chamber 46. In the suction region S, the first distribution valves 55 move near the radially outer position to provide communication between the corresponding pump ports a and the inner oil chamber 45 and to keep those pump ports a out of communication with the oil passages 53, so that the pump plungers 9 in the suction stroke draw working oil from the inner oil chamber 45 into the cylinder holes 8.

Between the discharge and suction regions D, S, there are provided switching neutral regions in which the pump ports a are held out of communication with the inner oil chamber 45 and the outer oil passages 53 by the first distribution valves 55.

When the eccentric ring 57 assumes the lock-up position 1 (see FIG. 4A), all of the first distribution valves 55 are kept in the switching neutral position by the eccentric ring 57 irrespective of rotation of the cylinder block 7, thus closing all of the pump ports a.

Figure 7:
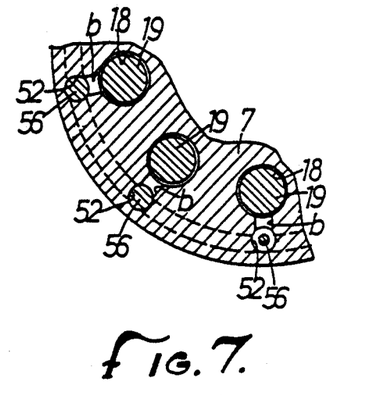
FIG. 7 is a cross-sectional view taken along line VII—VII of FIG. 2.

As shown in FIGS. 2 and 3, the second valve holes 52 extend in the cylinder block 7 through the first, second, and third outer oil chambers 46, 47, 48. Motor ports b are defined in the cylinder block 7 and open into the respective valve holes 52 intermediate between the first and third outer oil chambers 46, 48, the motor ports b communicating with the cylinder holes 18 adjacent thereto (see FIGS. 2 and 7).

Second spool-shaped distribution valves 56 are slidably disposed respectively in the second valve holes 52. The second distribution valves 56 have ends normally engaging in partly spherical recesses 62a of a valve swash plate 62 supported on the motor swash plate holder 27 through a thrust roller bearing 61 under the resiliency of springs 63.

The valve swash plate 62 is tilted a certain angle with respect to the axis of the cylinder block 7 about a second imaginary trunnion axis 03 which is 90° angularly spaced from or out of phase with the imaginary trunnion axis 02 of the motor swash plate 20 about the axis of the cylinder block 7. When the cylinder block 7 and the motor swash plate holder 27 rotate relatively to each other, the valve swash plate 62 reciprocally moves the second distribution valves 56 prescribed strokes. The positions of the second distribution valves 56 determine expansion and contraction regions Ex, Sh for the hydraulic motor M.

Figure 5:
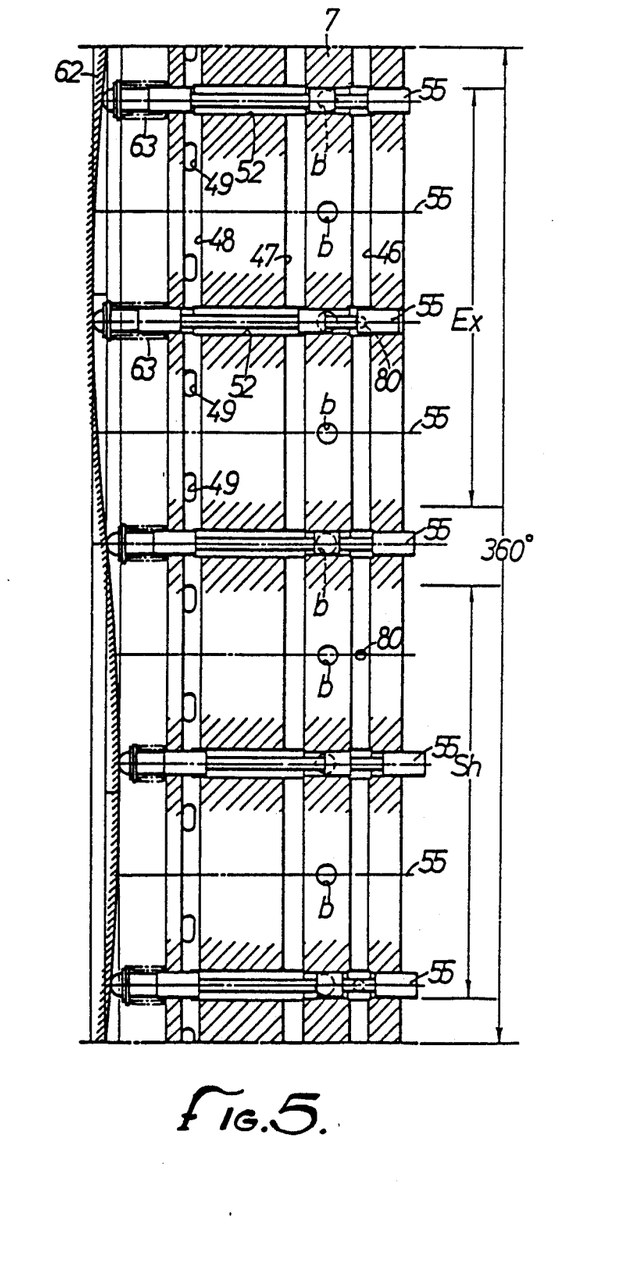
FIG. 5 is a cross-sectional view taken along line V—V of FIG. 2.

More specifically, as illustrated in FIG. 5, in the expansion region Ex, the second distribution valves 56 are in or near the lefthand limit position to provide communication between the corresponding motor ports b and the first outer oil chamber 46 and to keep those motor ports b out of communication with the second outer oil chamber 47, so that high-pressure working oil is supplied from the first outer oil chamber 46 into the cylinder holes 18 housing the motor plungers 19 in the expansion stroke. In the contraction region Sh, the second distribution valves 56 are in or near the righthand limit position to provide communication between the corresponding motor ports b and the second outer oil chamber 47 and to keep those motor ports b out of communication with the first outer oil chamber 46, so that the motor plungers 19 in the contraction stroke discharge working oil from the cylinder holes 18 into the lower-pressure second outer oil chamber 47.

The second distribution valves 56 do not prevent communication between the second and third outer oil chambers 47, 48 through the second valve holes 52. Therefore, oil discharged into the second outer oil chamber 47 flows back into the inner oil chamber 45 via the third outer oil chamber 48 and the oil passages 49.

Operation of the hydrostatically operated continuously variable transmission T thus constructed is as follows: While the pump swash plate 10 is inclined at an angle and the eccentric ring 57 is kept in the hydraulically operating position n, the input shaft 2 is rotated about its own axis by the power of the engine E. In the hydraulic pump P, while the pump plungers 9 in the discharge stroke are passing through the discharge region D, they discharge working oil under pressure from their cylinder holes 8 into the first outer oil chamber 46, whereas the pump plungers 9 in the suction stroke draw working oil from the inner oil chamber 45 into the cylinder holes 8 while those pump plungers 9 are passing through the suction region S.

The high-pressure working oil discharged into the first outer oil chamber 46 is supplied into the cylinder holes 18 housing the motor plungers 19 in the expansion region Ex, while at the same time working oil is discharged into the inner oil chamber 45 from the cylinder holes 18 housing the motor plungers 19 in the contraction region Sh.

The output gear 3 is rotated by the sum of the torque applied by the cylinder block 7 via the motor plungers 19 to the motor swash plate 20 and the torque applied by the motor plungers 19 in the expansion stroke to the motor swash plate 20. The torque of the output gear 3 is then transmitted to the differential Df.

It is now assumed that $n_P$ ... the number of the pump plungers 9, $n_M$ ... the number of the motor plungers 19, $d_P$ ... the diameter of the pump plungers 9, $d_M$ ... the diameter of the motor plungers 19, $D_P$ ... the diameter of the pitch circle of the circular array of the pump plungers 9, $D_M$ ... the diameter of the pitch circle of the circular array of the motor plungers 19, $O_P$ ... the angle of inclination of the pump swash plate 10 to a vertical plane, $O_M$ ... the angle of inclination of the motor swash plate 20 to a vertical plane, $S_P$ ... the stroke of the pump plungers 9, $S_M$ ... the stroke of the motor plungers 19, $Ni$ ... the speed of rotation of the input shaft 2, and $No$ ... the speed of rotation of the output gear 3.

The transmission ratio $\pi$ can now be calculated by the following equation:

$$\pi = \frac{Ni}{No} = \frac{1}{1 - \frac{n_P \cdot d_P^2 \cdot S_P}{n_M \cdot d_M^2 \cdot S_M}}$$

$$= \frac{1}{1 - \frac{n_P \cdot d_P^2 \cdot D_P \cdot \tan \theta_P}{n_M \cdot d_M^2 \cdot D_M \cdot \tan \theta_M}}$$

Where the motor swash plate 20 is angularly fixed at a certain angle $\theta_M$ as in the illustrated embodiment, therefore, if the angle $\theta_P$ of inclination of the pump swash plate 10 is selected to be zero, then $\pi \approx 1$, or $Ni \approx No$, so that the input shaft 2 and the output gear 3 are directly coupled to each other.

If $\theta_P < 0$, then $\pi > 1$, i.e., $Ni < No$, and hence the speed of rotation of the output gear 3 is increased.

$$\text{If } 0 < \tan \theta_P < \frac{n_M \cdot d_M^2 \cdot D_M}{n_P \cdot d_P^2 \cdot D_P} \cdot \tan \theta_M,$$

then $Ni > No > 0$, and hence the speed of rotation of the output gear 3 is increased.

$$\text{If } \tan \theta_P = \frac{n_M \cdot d_M^2 \cdot D_M}{n_P \cdot d_P^2 \cdot D_P} \cdot \tan \theta_M,$$

then $No = 0$ irrespective of $Ni$, and the transmission is in the neutral position.

$$\text{If } \tan \theta_p > \frac{n_M \cdot d_M^2 \cdot D_M}{n_P \cdot d_P^2 \cdot D_P} \cdot \tan \theta_M,$$

then $No < 0$, and the transmission is in the reverse position.

Figure 12:
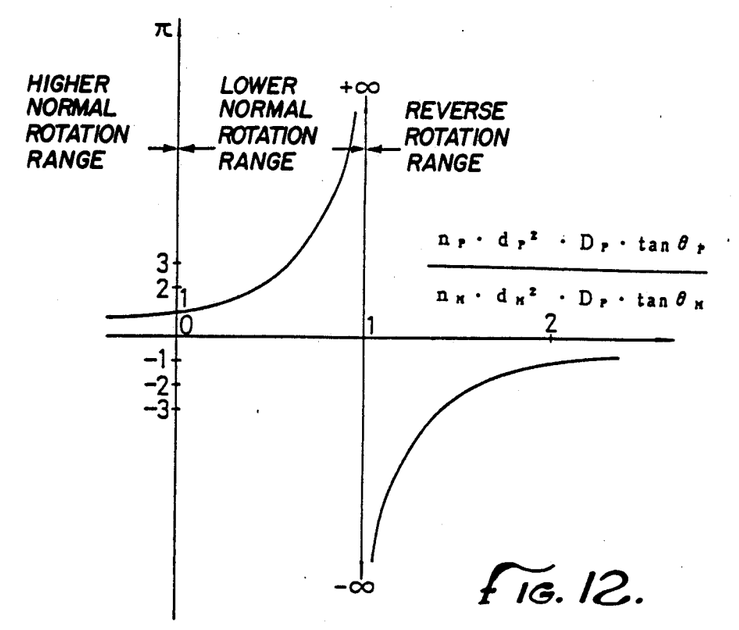
FIG. 12 is a graph showing the relationship between the angles of inclination of pump and motor swash plates and the transmission ratio.

The above conditions are illustrated in FIG. 12.

Even when the input shaft 2 and the output gear 3 are directly coupled, oil leakage is inevitable along the sliding surfaces subjected to high oil pressure, such as the sliding surfaces of the plungers 9, 19 and the cylinder holes 8, 18, and the sliding surfaces of the distribution valves 55, 56 and the valve holes 51, 52, and hence the transmission efficiency is lowered. And the condition No=Ni is often reached while the automobile is being driven. Under this condition, therefore, the eccentric ring 57 is controlled to move to the lock-up position 1 to cause all of the first distribution valves 55 to close all of the pump ports a. Since the hydraulic pump P and the hydraulic motor M are now out of mutual communication, those sliding surfaces which are subjected to high oil pressure are greatly reduced, and any reduction in the transmission efficiency due to oil leakage is lowered.

At the time of operation of the hydraulic pump p and the hydraulic motor M, the pump swash plate 10 receives a thrust load from the pump plungers 9 in one direction, and the motor swash plate 20 receives a thrust load from the motor plungers 19 in the opposite direction. The thrust load applied to the pump swash plate 10 is transmitted to the input shaft 2 through the thrust roller bearing 11, the trunnion shaft 12, the swash plate anchor 13 the thrust roller bearing 37, and the first thrust support plate 35. The thrust load applied to the motor swash plate 20 is transmitted also to the input shaft 2 through the thrust roller bearing 26, the motor swash plate holder 27, the thrust roller bearing 40, and the second thrust support plate 36. Therefore, the above thrust loads only develop tensile stresses in the input shaft 2, but are not imposed on the casing C.

As described above, the pump plungers 9 and the motor plungers 19 are positionally displaced relatively in the circumferential direction of the cylinder block 7, and the circle inscribed in the annular array of the motor plungers 19 passes through the pump plungers 9. Therefore, the pump plungers 9 and the motor plungers 19 are positioned closely to each other while providing partitions of enough thickness between the adjacent cylinder holes 8, 18. As a result, the axial dimension of the cylinder block 7 is greatly reduced while slightly increasing the diameter of the cylinder block 7.

This arrangement is highly effective in making compact the power unit U in which the engine E and the transmission T are axially arranged.

By employing the axially reciprocable second distribution valves 56, the second distribution valves 56 can be disposed in position while slightly increasing the diameter of the cylinder block 7, and the axial dimension of the cylinder block 7 can further be reduced. Since the valve swash plate 62 for actuating the second distribution valves 56 is disposed in surrounding relation to the motor swash plate 20, the valve swash plate 62 does not contribute to any increase in the axial dimension of the transmission T.

Figure 6:
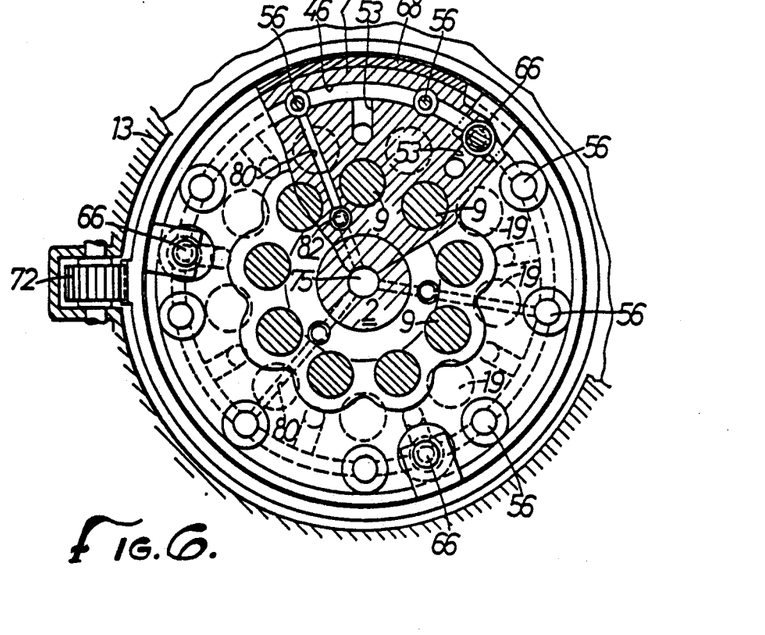
FIG. 6 is a cross-sectional view taken along line VI—VI of FIG. 3.

As shown in FIGS. 2 and 6, one or more third valve holes 65 (three valve holes 65 in the illustrated embodiment) are defined in the cylinder block 7, the third valve holes 65 extending between the second valve holes 52 and parallel thereto. The third valve holes 65 extend across the first and second outer oil chambers 46, 47 and have inner ends closed and outer ends opening at the righthand end surface (FIG. 2) of the cylinder block 7. Spool-shaped clutch valves 66 are slidably disposed respectively in the valve holes 65.

Each of the clutch valves 66 has an annular groove 67 defined in the outer periphery of its valve head projecting out from the righthand end surface of the cylinder block 7. In the annular groove 67, there engages a finger 68a bent radially inwardly from an inner operating ring 68 slidably fitted over the cylinder block 7. An outer operating ring 69 surrounding the inner operating ring 68 is coupled thereto by means of a release bearing 70. A rack 71 projects from one end of the outer operating ring 69 and extends axially thereof in mesh with a pinion 72 which is rotatably supported in the swash plate anchor 13. A clutch lever 73 is fixed to one end of the pinion 72.

By turning the clutch lever 73 to rotate the pinion 72 for thereby moving the outer operating ring 69 horizontally (FIG. 2), each of the clutch valves 66 can be shifted through the release bearing 70 and the inner operating ring 68 between a lefthand clutch-on position (indicated by the solid lines in FIG. 2) and a righthand clutch-off position (indicated by the two-dot-and-dash lines in FIG. 2). in the clutch-on position, the clutch valves 66 cut off communication between the first and second outer oil chambers 46, 47. In the clutch-off position, the clutch valves 66 allow communication between the first and second outer oil chambers 46, 47. When the first and second outer oil chambers 46, 47 communicate with each other, high-pressure working oil supplied from the hydraulic pump P via the first distribution valves 55 to the first outer oil chamber 46 immediately flows into the lower-pressure second outer oil chamber 47, thus bypassing the hydraulic motor M. As a consequence, oil pressure transmission from the hydraulic pump P to the hydraulic motor M is cut off in the clutch-off position.

Figure 9:
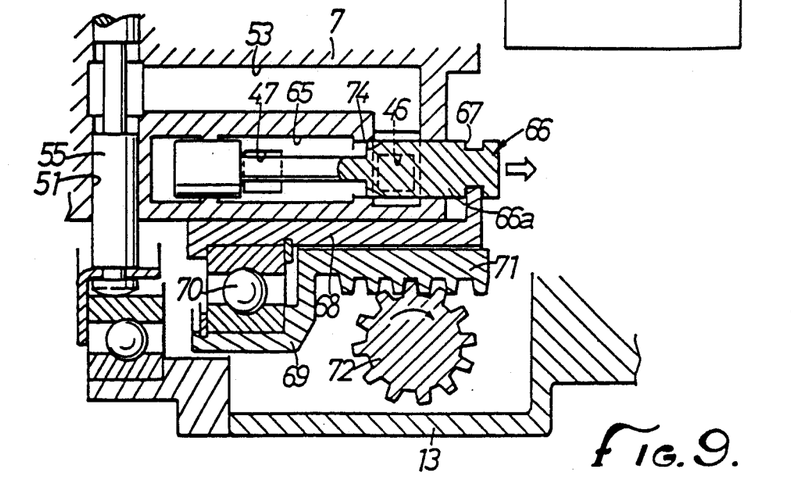
FIG. 9 is an enlarged fragmentary cross-sectional view of a clutch valve which is shown as being in a partly engaged position.

As shown in FIG. 9, each of the clutch valves 66 has a land 66a for selectively cutting off communication between the oil chambers 46, 47 and has one or more recesses 74 defined in an end thereof between the oil chambers 46, 47. When the clutch valve 66 is shifted from the clutch-off position to the clutch-on position, the recesses 74 provide delicate control over communication between the oil chambers 46, 47 for thereby reaching a partly engaging clutch position.

As illustrated in FIGS. 2 and 3, the input shaft 2 has a main oil passage 75 defined centrally axially therein and having a closed end. The main oil passage 75 has an open end communicating with an oil reservoir 77 on the bottom of the casing C through a replenishing pump 76. The replenishing pump 76 is actuated by a driver gear 78 on the outer periphery of the first thrust support plate 35 on the input shaft 2. Therefore, as long as the input shaft 2 rotates, oil in the oil reservoir 77 is fed to the main oil passage 75 by the replenishing pump 76.

The main oil passage 75 communicates with the inner oil chamber 45 through first radial replenishing holes 79 defined in the input shaft 2. First check valves 81 (FIG. 2) are disposed respectively in the first replenishing holes 79 for preventing oil from flowing back from the inner oil chamber 45 into the main oil passage 75. The check valves 81 are normally urged in a valve closing direction by a leaf spring 83 surrounding the input shaft 2.

The main oil passage 75 is also held in communication with the the first outer oil chamber 46 through a second replenishing hole 80 defined in the input shaft 2 and the cylinder block 7 and extending generally radially. The second replenishing hole 80 accommodates therein a second check valve 82 for preventing oil from flowing back from the first outer oil chamber 46 into the main oil passage 75. The check valve 82 is normally urged in a valve closing direction by a valve spring 84.

During normal operation of the transmission T in which the hydraulic motor M is hydraulically driven by the hydraulic pump P, working oil is supplied from the main oil passage 75 via the first replenishing oil passages 79 into the lower-pressure inner oil chamber 45. During engine braking in which the hydraulic pump P is hydraulically driven by the hydraulic motor M, working oil is supplied from the main oil passage 75 via the second replenishing passage 80 into the first outer oil chamber 46 which has become lower in pressure for thereby compensating for working oil leakage from the closed hydraulic circuit.

Figure 10:
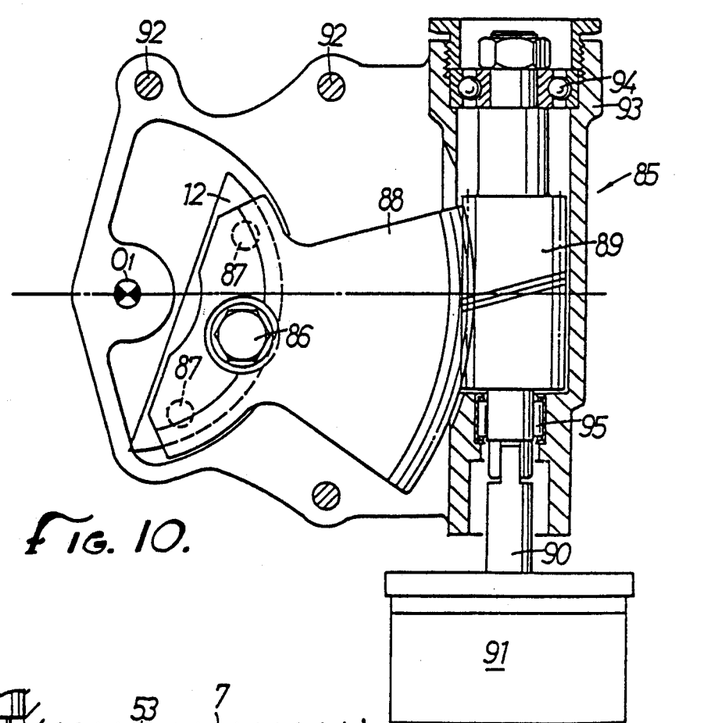
FIG. 10 is a cross-sectional view taken along line X—X of FIG. 3.

As shown in FIGS. 3 and 10, a transmission control device 85 is coupled to the trunnion shaft 12 for controlling the angle of the pump swash plate 10. The transmission control device 85 comprises a sector gear 88 fixed to the other end of the trunnion shaft 12 by means of a bolt 86 and a pair of knock pins 87, a worm gear 89 meshing with the sector gear 88, and a reversible DC motor 91 having a drive shaft 90 coupled to the worm gear 89. The worm gear 89 is rotatably supported in a gear box 93 by means of bearings 94, 95, the gear box 93 being fixed to the casing C by a bolt 92. The motor 91 has a stator fixed to a suitable portion of the casing C.

When the motor 91 is rotated in one direction or the other, the rotation is transmitted from the worm gear 89 to the sector gear 88 while its speed is being reduced thereby, and is then transmitted to the trunnion shaft 12 to rotate the same for erecting or tilting the pump swash plate 10.

When the motor 91 is de-energized to keep the pump swash plate 10 at a desired angle, the pump swash plate 10 receives a moment in a direction to erect or tilt the same from the motor plungers 19, and such a moment is applied via the trunnion shaft 12 to the sector gear 88. However, since the worm gear 89 cannot be rotated by the sector gear 88, the gears 88, 89 are locked together to prevent the trunnion shaft 12 from being rotated under such a moment. Therefore, the pump swash plate 10 is reliably held in position when the motor 91 is de-energized.

In the illustrated embodiment, the hydraulic motor serves as a hydraulic device and the motor swash plate as a plunger swash plate. The first and second outer oil chambers 46, 47 serve as high- and low-pressure oil chambers, respectively.

The transmission T may be arranged such that the input shaft is used as the output shaft and the output gear as the input gear with the hydraulic pump P serving as the hydraulic motor and the hydraulic motor M as the hydraulic pump.

With the arrangement of the present invention, as described above, the group of pump plungers and the group of motor plungers are concentrically positioned such that one of the plunger groups surrounds the other plunger group, and the plunger groups are positionally displaced relatively in the circumferential direction of the cylinder block so that the circle inscribed in one of the plunger groups passes through the other plunger group. Consequently, the axial dimension of the cylinder block is greatly reduced, and any increase in the diameter of the cylinder block due to the concentrically disposed plunger groups is minimized. As a result, the overall transmission is rendered compact.

What is claimed is:

1. A hydrostatically operated continuously variable transmission, comprising:
 a swash-plate type hydraulic pump and a hydraulic motor which are interconnected by a closed hydraulic circuit, said hydraulic pump having a group of pump plungers and said hydraulic motor having a group of motor plungers, said groups of pump and motor plungers being disposed in annular patterns in a cylinder block having a central portion coupled to a transmission shaft;
 annular lower- and higher-pressure oil chambers defined in said cylinder block in communication with inlet and outlet sides of said hydraulic pump; and
 a clutch valve disposed in a valve hole for opening and closing the valve hole, said valve hole extending axially in the cylinder block to provide communication between said lower- and higher-pressure oil chambers.

2. A clutch apparatus in a swash-plate-type hydrostatically operated, continuously variable transmission having a hydraulic pump and a hydraulic motor connected though a closed hydraulic circuit, said hydraulic pump and said hydraulic motor being defined in a cylinder block, said cylinder block being rotatable about an axis, said hydraulic pump having pump plungers disposed in an annular pattern in said cylinder block, said hydraulic motor having motor plungers disposed in an annular pattern in said cylinder block, said hydraulic circuit having a high pressure side and a low pressure side, an annular high pressure oil chamber in said cylinder block in communication with said high pressure side, and an annular low pressure oil chamber in said cylinder block in communication with said low pressure side, comprising:
 a valve hole in said cylinder block, said valve hole communicating with said high pressure and low pressure oil chambers and being aligned with its axis parallel to the axis of rotation of said cylinder block;
 a clutch valve in said valve hole; and
 means for operating said clutch valve to selectively connect and disconnect said high and low pressure oil chambers.

3. A clutch apparatus according to claim 2, wherein said clutch valve projects out of said cylinder block.

4. A clutch apparatus in a swash-plate-type hydrostatically operated, continuously variable transmission having a hydraulic pump and a hydraulic motor connected though a closed hydraulic circuit, said hydraulic pump and said hydraulic motor being defined in a cylinder block, said cylinder block being rotatable about an axis, said hydraulic pump having pump plungers disposed in an annular pattern in said cylinder block, said hydraulic motor having motor plungers disposed in an annular pattern in said cylinder block, said hydraulic circuit having a high pressure side and a low pressure side, an annular high pressure oil chamber in communication with said high pressure side, and an annular low pressure oil chamber in communication with said low pressure side, comprising:
 a valve hole in said cylinder block, said valve hole communicating with said high pressure and low pressure oil chambers and being aligned with its axis parallel to the axis of rotation of said cylinder block;
 a clutch valve in said valve hole; and
 means for operating said clutch valve to selectively connect and disconnect said high and low pressure oil chambers;
 wherein said clutch valve projects out of said cylinder block;
 wherein said means for operating said clutch valve comprises:

an inner operating ring slidably fitted over said cylinder block, said inner operating ring engaging said clutch valve for positioning said clutch valve;

an outer operating ring for positioning said inner operating ring; and a release bearing coupling said inner operating ring and said outer operating ring for transmitting axial movement of said outer operating ring to said inner operating ring.

5. A clutch apparatus in a swash-plate-type hydrostatically operated, continuously variable transmission having a hydraulic pump and a hydraulic motor connected though a closed hydraulic circuit, said hydraulic pump and said hydraulic motor being defined in a cylinder block, said cylinder block being rotatable about an axis, said hydraulic pump having pump plungers disposed in an annular pattern in said cylinder block, said hydraulic motor having motor plungers disposed in an annular pattern in said cylinder block, said hydraulic circuit having a high pressure side and a low pressure side, an annular high pressure oil chamber in said cylinder block in communication with said high pressure side, and an annular low pressure oil chamber in said cylinder block in communication with said low pressure side, comprising:

a valve hole in said cylinder block, said valve hole communicating with said high pressure and low pressure oil chambers and being aligned with its axis parallel to the axis of rotation of said cylinder block;

a clutch valve in said valve hole; and means for operating said clutch valve between a clutch on position in which said high and low pressure oil chambers are disconnected, a clutch partially engaging position in which said high and low pressure oil chambers are partially connected, and a clutch off position in which said high and low pressure oil chambers are connected.

6. A clutch apparatus according to claim 5, wherein said clutch valve projects out of said cylinder block.

7. A clutch apparatus in a swash-plate-type hydrostatically operated, continuously variable transmission having a hydraulic pump and a hydraulic motor connected though a closed hydraulic circuit, said hydraulic pump and said hydraulic motor being defined in a cylinder block, said cylinder block being rotatable about an axis, said hydraulic pump having pump plungers disposed in an annular pattern in said cylinder block, said hydraulic motor having motor plungers disposed in an annular pattern in said cylinder block, said hydraulic circuit having a high pressure side and a low pressure side, an annular high pressure oil chamber in communication with said high pressure side, and an annular low pressure oil chamber in communication with said low pressure side, comprising:

a valve hole in said cylinder block, said valve hole communicating with said high pressure and low pressure oil chambers and being aligned with its axis parallel to the axis of rotation of said cylinder block;

a clutch valve in said valve hole; and means for operating said clutch valve between a clutch on position in which said high and low pressure oil chambers are disconnected, a clutch partially engaging position in which said high and low pressure oil chambers are partially connected, and a clutch off position in which said high and low pressure oil chambers are connected;

wherein said clutch valve projects out of said cylinder block;

wherein said means for operating said clutch valve comprises:

an inner operating ring slidably fitted over said cylinder block, said inner operating ring engaging said clutch valve for positioning said clutch valve;

an outer operating ring for positioning said inner operating ring; and a release bearing coupling said inner operating ring and said outer operating ring for transmitting axial movement of said outer operating ring to said inner operating ring.

8. A hydrostatically operated continuously variable transmission according to claim 1, wherein said valve hole is located in said cylinder block radially distant from a rotational center of said cylinder block.

9. A clutch apparatus according to claim 2, wherein said valve hole is located in said cylinder block radially distant from said axis of rotation of said cylinder block.

10. A clutch apparatus according to claim 6, wherein said valve hole is located in said cylinder block radially distant from said axis of rotation of said cylinder block.

11. A hydrostatically operated continuously variable transmission, comprising:

a swash-plate-type hydraulic pump and a hydraulic motor which are interconnected by a closed hydraulic circuit, said hydraulic pump having a group of pump plungers and said hydraulic motor having a group of motor plungers, said groups of pump and motor plungers being disposed in annular patterns in a cylinder block having a central portion coupled to a transmission shaft;

a pump swash plate for engaging said pump plungers at a first axial end of said cylinder block and a motor swash plate for engaging said motor plungers at a second, opposite axial end of said cylinder block;

annular lower- and higher-pressure oil chambers defined in said cylinder block in communication with inlet and outlet sides of said hydraulic pump; and a clutch valve slidably disposed in a valve hole for opening and closing the valve hole, said valve hole extending axially in the cylinder block to provide communication between said lower- and higher-pressure oil chambers, said clutch valve being slidable along a direction parallel to the axis of the cylinder block.

12. A hydrostatically operated continuously variable transmission according to claim 11, wherein said valve hole is located in said cylinder block radially distant from a rotational center of said cylinder block.

* * * * *